Jan. 28, 1941.  A. BOYNTON  2,229,636
WELL TESTING DEVICE, RATHOLE TYPE
Filed Oct. 28, 1938  4 Sheets-Sheet 1

ALEXANDER BOYNTON,
INVENTOR,
BY Jesse R. Stone
Lester B. Clark
ATTORNEYS.

Jan. 28, 1941.  A. BOYNTON  2,229,636
WELL TESTING DEVICE, RATHOLE TYPE
Filed Oct. 28, 1938  4 Sheets-Sheet 2

ALEXANDER BOYNTON,
INVENTOR
BY Jesse R. Stone
Lester B. Clark
ATTORNEYS.

Jan. 28, 1941. A. BOYNTON 2,229,636
WELL TESTING DEVICE, RATHOLE TYPE
Filed Oct. 28, 1938 4 Sheets-Sheet 3

ALEXANDER BOYNTON, INVENTOR,
BY Jesse R. Stone
Lester D. Clark
ATTORNEYS.

Jan. 28, 1941.  A. BOYNTON  2,229,636
WELL TESTING DEVICE, RATHOLE TYPE
Filed Oct. 28, 1938  4 Sheets-Sheet 4
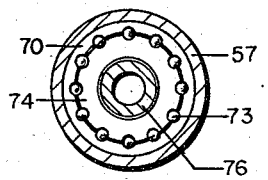
Fig. 19.
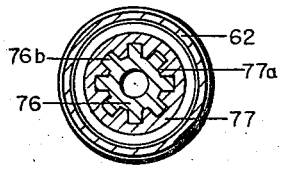
Fig. 20.
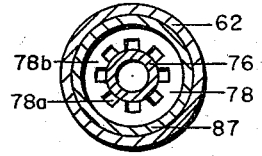
Fig. 21.
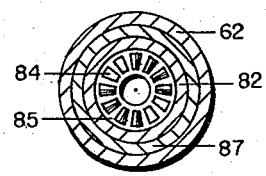
Fig. 22.
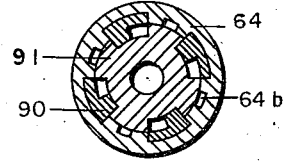
Fig. 23.
Fig. 24.
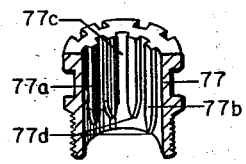
Fig. 25.
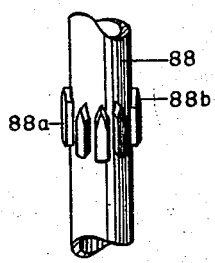
Fig. 26.
Fig. 27.
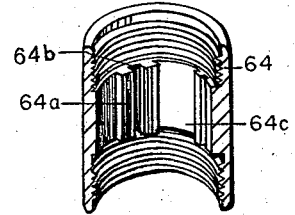
Fig. 28.
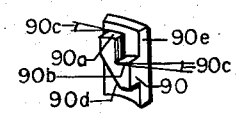
Fig. 29.
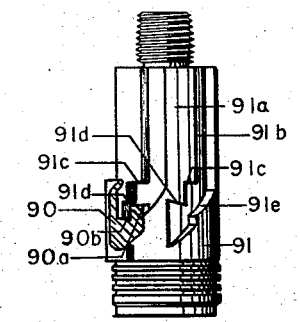
Fig. 30.
ALEXANDER BOYNTON,
INVENTOR,
BY Jesse R. Stone
 Lester B. Clark
ATTORNEYS.

Patented Jan. 28, 1941

2,229,636

UNITED STATES PATENT OFFICE 2,229,636

WELL TESTING DEVICE, RATHOLE TYPE

Alexander Boynton, San Antonio, Tex.

Application October 28, 1938, Serial No. 237,524

17 Claims. (Cl. 166—1)

This invention relates to improvements in well testing devices in which a packer, packer landing means, clutch, latch, flare chamber, valves, to exclude well fluid from the drill stem and to allow pump fluid to be discharged thru it and to entrap test fluid in the drill stem, and an instrument housing case are formed into an assembly to be run into an uncased well for the purpose of ascertaining the nature and quantity of fluid which the well would produce if casing be set and the well completed.

It is important that temperatures and pressures of producing formations be ascertained.

Some testing tools, such as those which employ shear pins, fracture plates, or left hand threads, have to be manually conditioned and readjusted for each test, which entails trouble, expense, and loss of time. This device employs no left hand threads, requires no left hand rotation, has no gears, shear pins, or fracture plate, and makes no use of falling weights, godevils, or other uncertain means to operate it. All parts of this device automatically resume their normal positions in readiness for another test as soon as the packer is lifted from its seat at conclusion of the preceding test.

In order to overcome the foregoing dangers and difficulties, the main objects of this invention are to provide a formation testing device for drilled or drilling wells, which device has the following advantages:

First—That it may be safely run into, and readily withdrawn from a well for the purpose of recovering a measured sample of the well's production from the horizon below where the packer is set.

Second—That the drill stem or other pipe upon which the device is run may be rotated from top to bottom, including the device itself, while it is being lowered into or being withdrawn from the well.

Third—That the drill stem may be rotated above the packer during a production test while the packer remains stationary.

Fourth—That the device may be pumped through at any time.

Fifth—That it affords means for signalling the operator when mud or cavings that should be rotated through or pumped out have been encountered as the device is being lowered into operating position.

Sixth—That it enables the packer to be repeatedly let down upon its seat until the best possible seal-off has been obtained before the test is begun by opening the intake ports.

Seventh—That it minimizes resistance from mud fluid in the well while it is being lowered and while the packer is being lifted from its seat, and while the device is being withdrawn from the well, by allowing part of the mud fluid to pass through the packer at all such times.

Eighth—That it automatically returns all of its parts to their normal positions when the drill stem is raised at conclusion of each test, thus enabling that the tests may be repeated as often as desired, by raising the drill stem slightly and swabbing or bailing out the test fluid at conclusion of each test.

Ninth—That it will show whether any of the test fluid came from formations other than the one being tested.

Tenth—That pressure and temperature recording instruments, and other instruments, if desired, may be placed in the device for the purpose of ascertaining the pressure and temperature and variations thereof, which obtained in the well during the test.

Eleventh—That the great expense of coring formations in order to estimate the production thereof may be now largely dispensed with by employing this device to actually determine the future production which cores frequently indicate inaccurately.

Twelfth—That, in effect, by temporarily producing from the well before casing is set, the great financial risk of completing unproductive wells may be definitely avoided.

With the foregoing, and other related objects in view, reference is now made to the drawings, in which Fig. 1 is an outside view of the device in a well bore, showing the packer seated upon the rathole.

Fig. 19 is a transverse section on the line 19—19, Fig. 16.

Fig. 20 is a transverse section on the line 20—20, Fig. 16.

Fig. 21 is a transverse section on the line 21—21, Fig. 16.

Fig. 22 is a transverse section of the line 22—22, Fig. 16.

Fig. 23 is a transverse section on the line 23—23, Fig. 16.

Fig. 24 is a transverse section on the line 24—24, Fig. 16.

Fig. 25 is a longitudinal section in perspective of the shell upper end in Fig. 16.

Fig. 26 is a perspective view of a portion of the nipple in Fig. 16.

Fig. 27 is a transverse section on the line 27—27, Fig. 11.

Fig. 28 is a longitudinal section in perspective of the coupling in Fig. 16.

Fig. 29 is an outside view in perspective of the lugs in Fig. 16.

Fig. 30 is an outside view of the clutch shell in Fig. 16, showing a portion of the part illustrated in Fig. 29, superimposed upon it.

The same reference characters are employed to refer to the same parts throughout the several views.

Figure 1:
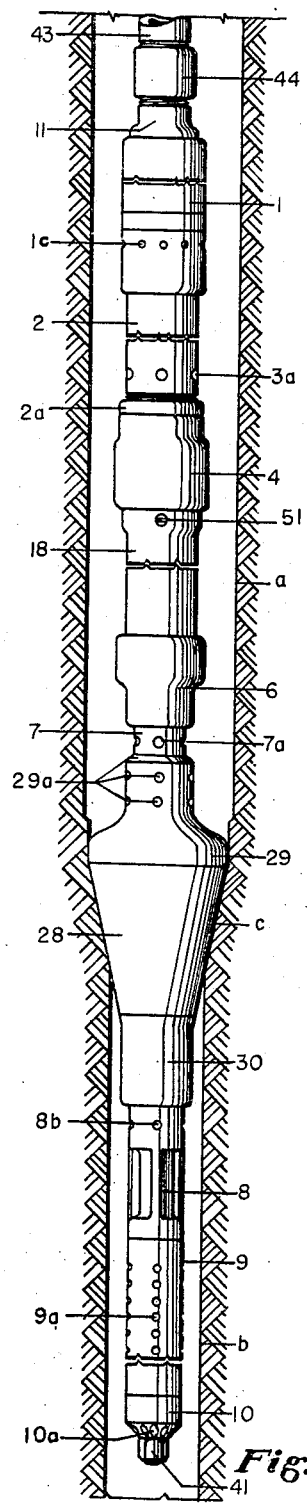

In Fig. 1, the preferred form of the invention is shown inserted in a well bore a, with the packer seated at c upon the rathole b, the drill stem 43 being connected to member 11 by coupling 44.

The device may be said to consist of the following units or association of parts:

The outer shell consists of latch clamp member 1, nipple 2, coupling member 4, nipple 5, reducing coupling 6, nipple 7, connection member 8, having longitudinal ribs 8a, nipple 9, and bottom plug 10, having openings 10a.

The inner string consists of a drill stem connection member 11, nipple 15, having wrench slots 15a; connection member 16, clutch shell 17, nipple 18, member 19, connection member 26, valve actuating nipple 27, and intake port carrier nipple 27B.

Figure 2:
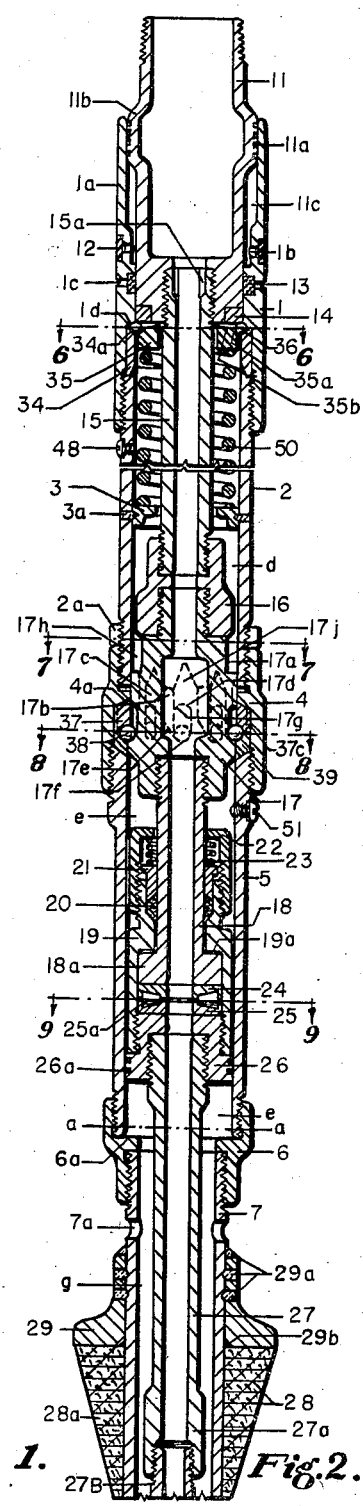
Fig. 2 is a longitudinal section of the upper portion of the preferred form of the invention.

The packer 28, Fig. 2, which may be of rubber, leather, belting washers, or other tough, durable substance, is illustrated as consisting of a plurality of belting washers 28a fitted over the lower portion of packer carrier nipples 7 and locked against upper retaining member 29 by lower retaining member 30, having threaded connection over the member 8, the member 29 being secured upon nipple 7 by welds 29a and 29b.

Pressure equalization by fluid communication between the rathole below the packer and the bore above the packer while the packer is being seated, is very important in order to prevent the packer seat from being cut by the fluid that would otherwise be forced out between the packer and the seat; but such equalization is still more important while the packer is being raised from its seat.

This pressure is equalized the moment the drill stem is raised far enough to open valve 27a in the preferred form, or valve 27Aa in the first modified form, or valve 93c uncovering ports 67b in the second modified form. In all three forms it will be noted that these valves, respectively, are opened before any lifting force is exerted upon the drill stem; and therein resides one of the most important features of this invention.

The openings 7a and 8b and the annular space g within nipple 7 and member 8 provide for circulation through the packer while it is being lowered into or being withdrawn from the well, and while the packer is being seated. This circulation path is closed when valve 27a enters the upper end of member 8 as appears in Fig. 5, the member 27a having a close sliding fit within the upper end of member 8.

In addition to equalizing the pressure above and below the packer during the seating operation, as well as making it easier to lower and raise the packer in the well bore, the openings 7a and 8b and the annular chamber g, which provides communication between them, also largely overcomes the danger of the packer sticking or becoming fast in the rathole, because these openings cause the pressure to equalize on both sides of the packer as soon as the valve 27a is raised out of its engagement within the restricted area in the member 8, which occurs before any unseating pull is exerted upon the packer.

Well fluid is excluded from the drill stem before the packer is set by means of check valve 33 normally engaging its seat 27Bb upon the lower end of nipple 27B by expansive force of spring 49 engaging under support 42 having a central depression upon its upper surface within which check valve 33 rests. When the check valve is unseated by pump pressure the pump fluid passes out of the member 31 through slots 31c, in the tubular extension 31b. It will be noted that the upper end of the member 31 is formed into a piston having peripheral grooves 31a. This piston has a close sliding fit within nipple 9. The ring 32 secured upon nipple 27B by weld 32a forms a shoulder against which piston 31 locks in its threaded engagement upon nipple 27B. The purpose of this piston is to prevent pump fluid from passing out through openings 9a, thereby forcing it out through the lower openings 10a. The expansive force of spring 49 is aided by the pressure of well fluid exterior of the device in causing the check valve to remain normally closed. This check valve, which will be opened by pump pressure only, will not be opened by weight of the entrapped well fluid, and spill the test sample as the device is withdrawn from the well because the spring 49 is installed under enough compression to support a column of well fluid somewhat longer than the distance which the drilling mud will recede in the well bore as the drill stem is withdrawn.

If the drill stem be pumped through, the path of the pump fluid will be downward through the inner string and check valve assembly, past the instrument case 45, and out through openings 10a in bottom member 10. Manifestly, this bottom end member may be replaced by a bit of such size as will enter the rathole if, in lowering the tool, mud or cavings should require the use of a bit.

Figure 3:
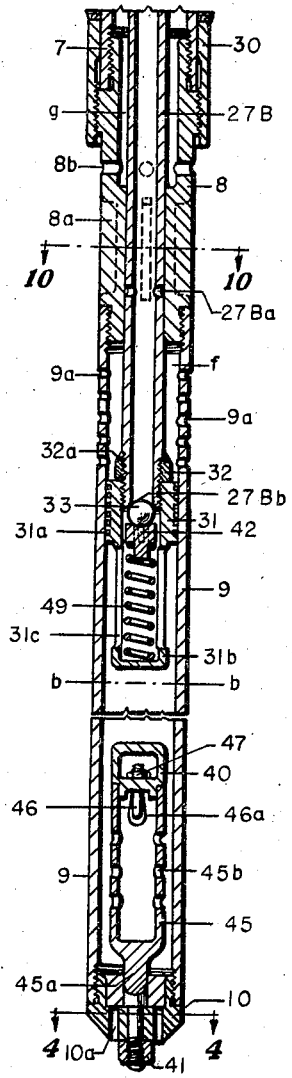
Fig. 3 is a longitudinal section of the lower portion of the preferred form of the invention completing the part shown in Fig. 2.
Figure 4:
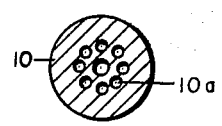
Fig. 4 is a transverse section on the line 4—4, Fig. 3.

Inlet ports 27Ba are normally closed by the close sliding fit which the nipple 27B has within the member 8, as appears in Fig. 3. After the latch has been sprung, the packer has been seated upon the rathole, and the drill stem has been rotated part of a turn clockwise, as will be later explained, the intake ports 27Ba move downward out of the member 8, and assume the position shown in Fig. 5. Well fluid from the rathole then enters the drill stem through inlet openings 9a and intake ports 27Ba, as also appears in Fig. 5. It will be noted that communication between the pressure equalizing openings 7a and 8b is closed by valve 27a while the device is intaking test fluid. At conclusion of the intaking period, which is usually from 15 to 45 minutes, the inlet ports are closed when the drill stem is raised, at the same time lifting the nipple 27B to permit communication between the ports 7a and 8b to equalize the pressures above and below the packer. This occurs while the packer is still seated, and before any lifting force is exerted upon it, because the lower pockets 17f, Fig. 14, which engage the clutch balls 38 at completion of the upward telescopic movement of the inner string within the outer shell permit enough movement to cause intake ports 27Ba to become sheathed within the member 8 as appears in Fig. 3.

Latch balls 36 received within circular recesses 1d—34a in the latch clamp member 1 and the sleeve 34 as seen in Fig. 2 are resiliently engaged between the ball rider ring 14 and ball floor ring 35 by the expansive force of latch spring 50. Latch spring base 3, secured within latch spring housing nipple 2 by means of welds 3a, supports spring 50, which spring, installed under compression, urges the latch to closed position and the entire device to its most elongated position, wherein clutch balls 38 engage within lower pockets 17f thereby arresting the telescopic elongation. The recesses 1d—34a should preferably be formed to fit the contour of the latch balls and should be of a depth slightly less than one-half the diameter of the balls. If the recess 1d—34a is as deep or deeper than one-half the diameter of the balls, the balls will impinge between the ring 14 and the recess 34a, and thereby render the latch inoperative. The latch balls may be $\frac{5}{16}$" to $\frac{7}{16}$" in diameter. If the balls are $\frac{7}{16}$" in diameter, $\frac{5}{64}$" to $\frac{3}{32}$" depth of the groove 1d—34a will be found satisfactory. The ring 14, which may be pressed upon the lower end of member 11 preferably should be of hardened steel; likewise the balls, ring 35, and sleeve 34 should be hardened. The sleeve 34 has a close removable fit within member 1, and is normally secured in position shown by the threaded engagement between member 1 and nipple 2. The latch spring 50 may be, for example, 9 feet long, compressed to 7 feet installed, and should be of such strength as will enable the latch to be adjusted to support one-half to three-fourths the weight of the drill stem. The latch is held in the engaged position, as shown in Fig. 2, by the expansive force of spring 50, which urges the steeply inclined surface 35a against the balls, thereby impinging them upon the recess 1d.

When the latch is sprung, by weight of the drill stem, the balls ride downward between the rings 14 and 35, and in doing so, engage inner surfaces of sleeve 34 and nipple 2. It will be noted that the upper surface of the ring 35 is of two angles. The steeper or latching angle surface 35a engages the balls while they are imbedded in the recess 1d—34a, as stated; thus imparting great force to the engagement. When the balls are forced out of the recess as the latch springs, they engage upon the more horizontal or unlatching angle surface 35b, the angle of which is such as will return the balls into their recess 1d—34a when the latch returns; but at the same time will not urge the balls outward with enough force to score the inner wall of nipple 2.

Assuming that the latch balls are within the circular recess 1d—34a to a maximum depth of slightly less than one-half the diameter of the balls, the latch may be adjusted to be sprung by the application of less force by lessening the depth that they are allowed to enter this recess. The less they enter it, the easier they can be forced out of it. Such adjustment may be made by screwing the nipple 2 upward in coupling member 4; locking ring 2a being employed to secure the adjustment. In making such adjustment, it can be observed that the ring 14 is not also forced upward as the nipple 2 is forced upward because the clutch balls 38 engaging the lowermost pockets 17f of slots 17b do not permit such movement. It is apparent that another purpose of spring 50 is to automatically return the latch to engaging position after the force which springs it has been released.

The latch and clutch chamber d, Fig. 2, closed at its upper end by connection member 11, slidable within the member 1, and closed at the lower end by member 26, may be filled with a lubricant to provide lubrication for the latch and clutch. This lubricant may be supplied through the openings shown closed by plugs 48 and 51, Fig. 2.

Figure 12:
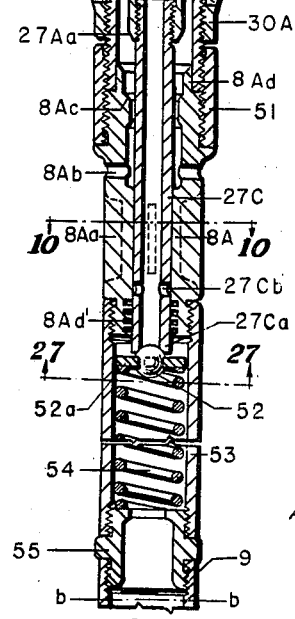
Fig. 12 is a perspective view in longitudinal section of the part 37 in Fig. 2.
Figure 12:
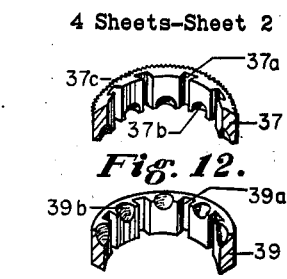
Figure 13:
Fig. 13 is a perspective view in longitudinal section of the part 39 in Fig. 2.

The clutch in Fig. 2, is shown in its normal engaged position, as when being lowered into or being withdrawn from the well. This clutch is formed of shell 17, balls 38, upper ball socket base 37, and lower ball socket base 39. The upper base 37 having slots 37a, Fig. 12, for circulation of a lubricant within the annular chamber c, may be pressed into clutch coupling member 4 and landed upon the internal shoulder 4a, Fig. 2, the flutes 37c being imbedded within the inner wall of this coupling member. The lower ball socket base 39, having circulation slots 39a, Fig. 13, similar to, and aligning with, the circulation slots 37a, is removably fitted closely within the member 4 for convenience in assembling and taking the clutch apart. The lower base 39 is held in place by the threaded engagement between members 4 and 5, as appears in Fig. 2. The clutch balls 38 are received for one-half of their diameter within sockets 37b and 39b, Figs. 12 and 13, and extend for the other half of their diameter into the slots 17b, Fig. 14, formed by the several short ribs 17c and the one long rib 17j. These slots, like the sockets, have a common depth equal to approximately one-half the diameter of the balls 38. The slots are open at their upper ends and are of irregular shape in their closed lower ends where they are formed into pockets 17f, conforming to the balls. The upper portion of reduced external diameter 17a provides the annular space 17h, Fig. 2, also having a uniform depth equal to one-half the diameter of the balls.

The shell 17, therefore, is longitudinally and rotatably movable within limits imposed by the slots 17b and the annular space 17h; longitudinal movement being permitted by the slots and the rotatable movement being permitted by the turned off portion 17a. The balls 38, while free to rotate in their respective sockets, cannot leave their sockets because, as stated, the slots 17b and annular space 17h have a common depth equal to one-half the diameter of the balls. The lower base 39; otherwise free, is locked with upper base 37 by the balls imbedded equally within the mating sockets 37b and 39b, Figs. 12 and 13; and since the flutes 37c are securely imbedded within the coupling member 4, it is apparent that the inner string and outer shell of the device are locked together against independent rotation as long as the balls remain within their respective slots 17b. The downward movement of the inner string at beginning of the test after the packer has been seated, places the annular space 17h opposite the balls. This movement disengages the clutch. The drill stem may be then freely rotated upon rollers 25a, leaving stationary the outer shell, packer, and all other parts below the thrust bearing. The clutch is always so disengaged while the device is intaking test fluid, because the valve travel is determined by the travel of the member 26, having its downward movement stopped by landing floor 6a; this travel being sufficient to place clutch balls 38 opposite the turned off portion 17a above the upper end of longest rib 17j, which movement disengages the clutch.

At conclusion of the test, there is no danger that the ribs may impinge upon the balls due to some possible error in spacing the upper wedge shaped ends of the ribs, because the one rib 17j is longer than the others and, therefore, acts as a pilot to guide the other ribs between the balls.

Figure 14:
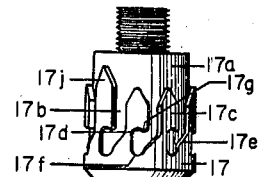
Fig. 14 is an outside view of the part 17 in Fig. 2.

In the return movement of shell 17 the sloping surfaces 17e, Figs. 2 and 14, automatically guide the clutch balls into their lower pockets 17f. The expansive force of latch spring 50, aided by the weight of the movable shell of the device, plus the resistance offered to raising the packer from its seat in the rathole, accomplishes this quick and automatic return of all parts to their normal positions at conclusion of each test.

The external flange 18a engaging under the internal flange 19a of the clutch shell member 19 holds the thrust bearing top 24; rollers 25a, and thrust bearing base 25 assembled by the threaded engagement between clutch shell member 19 and connection member 26. Packing 20, gland 21, and spring 23, adjustably held by clamp cap 22, threadedly engaged over the upper extension 19, provide that the thrust bearing will not permit leakage into or out of the drill stem.

The upper pockets 17d engage the clutch balls instantly after the latch springs. A slight clockwise rotation of the drill stem will then force the downwardly inclined surfaces 17g over the balls until the upper straight portion of slots 17b register in vertical alignment with the balls. The drill stem then moves downward by force of gravity until the member 26 lands on floor 6a, Fig. 2. This travel, as stated, is such as will place the turned off portion 17a above the longest rib 17j, at which time the drill stem may be rotated independently of the packer and other parts below the thrust bearing during the test intaking period. The method of landing the packer will be discussed in connection with operation.

The lower portion of connection member 16 immediately above the clutch shell has slight clearance, such as 1/16" to 1/8" within the nipple 2, this clearance being for free passage of a lubricant, which preferably should be placed within the chamber d for lubrication of the latch and clutch.

The lower piston-like end of the member 11 and the other piston-like member 26 should preferably be of the same diameter, in order that the lubricant in chamber d will move freely between the pistons without impinging them on one stroke or causing a vacuum to be pulled between them on the other stroke, as would result if one piston were of greater diameter than the other.

It should be observed here that the clutch is always engaged while the latch is engaged, and vice versa. If mud or cavings be encountered while the device is being lowered into the well, the same may be washed out by pumping thru the device or drilled out by rotating the drill stem. If the latch springs while the drill stem is being rotated, the drill stem should be then raised slightly to re-engage the latch. Rotation may be then resumed without danger of disengaging the clutch and opening the intake ports until the latch is again sprung. The latch, as stated, may be set to withstand as much weight as desired before it will the device is being lowered, will enable the packer spring. Ordinarily, rotating the drill stem while the device is being lowered, will enable the packer to be seated in the rathole without having it employ the pump. If, however, it should be necessary to rotate the drill stem and pump thru it at the same time, both may be done. If pumped thru, the drill stem, of course, must be emptied by bailing, swabbing, or by withdrawing it from the well before a clean test sample can be obtained.

The annular chamber 11c is a flare chamber, which may be filled with a flare liquid of different color from the well fluid, red or yellow lead paint being generally satisfactory. The expanded portion 11b, having peripheral grooves 11a, of the member 11 has a close sliding piston fit within the flare chamber shell 1a and the lower portion of member 11 has a close sliding piston fit within the central portion of member 1 above and below packing 13. Well fluid pressure entering thru pressure ports 1c, causes packing 13 to closely engage upon the member 11. The flare fluid is placed in chamber 11c thru openings 1b shown closed by rubber band 12. When the drill stem settles within the outer shell, as the intake ports are opened by a partial clockwise rotation and slight settlement of the drill stem, it is apparent that the flare fluid will be forced out of chamber 11c thru discharge ports 1b, the rubber band 12 yielding to permit such escape. When the drill stem is raised within the outer shell after the intaking period of the test, well fluid will enter the chamber 11c thru openings 1b, the rubber band 12 yielding or rupturing to permit such entrance.

If it be desired to employ more flare fluid than that contained in chamber 11c, the chamber e, Fig. 2, may also be filled with flare fluid thru the openings 7a, which openings may be then closed with a rubber band similar to the one employed to close the openings 1b.

If two telltale substances of different colors be discharged each at a different level above the packer, presence in the test sample of the lower telltale fluid only will indicate that the packer leaked only slightly, but if both telltale substances are found in the test fluid, it will be apparent that the leak past the packer was of greater volume.

The member 26, having peripheral grooves 26a, has a close piston fit within the nipple 5 and serves to confine the latch and clutch lubricant within the chamber d, as well as to determine the valve travel by landing upon floor 6a. The breather openings 7a provide that the member 26 will not impinge upon fluid in the chamber e on the downward stroke or pull a vacuum therein on the upward stroke, as is apparent.

The instrument case 45, Fig. 3, having lateral openings 45b, has a lower rod-like extension 45a, which has its lower end of reduced diameter secured within a central opening thru bottom end member 10 by means of nut 41. Studs 46, are secured within the case by welds 46a. The cover 40 is secured by nuts 47. Instruments may be placed in the case 45 for recording pressures and temperatures obtaining in the well. Well fluid in the rathole below the packer enters the instrument case thru lower openings 10a and lateral openings 45b.

In operation the device is shown in Fig. 1 as positioned in the well bore a, by means of drill stem 43 and coupling 44, with the packer engaged at c upon the rathole b. The full weight of the drill stem, os as much thereof as necessary, is allowed to force the packer into engagement with the seat c upon the rathole. This engagement must be such that well fluid above the packer will not migrate downward past the packer while the device is intaking test fluid. In order to cause such engagement it is generally desirable that the packer be landed upon the rathole several times. This may be done. Each time the packer lands the latch will spring and the upper pockets 17d will engage the clutch balls 38. Each time the drill stem is raised the lower pockets 17f will engage the balls, and each time it is lowered the upper pockets 17d will re-engage the balls, this travel ordinarily being 1½" to 2", and not enough to cause the intake ports 27Ba to pass out of the lower end of member 8. When the operator is satisfied that the packer has been properly seated, the drill stem is rotated clockwise part of a turn moving the downwardly inclined surfaces 17g, Figs. 2 and 14, upon the balls 38 until the balls become vertically aligned with the upper portion of slots 17b. The drill stem then settles by its own weight until the member 26 lands upon floor 6a.

Figure 5:
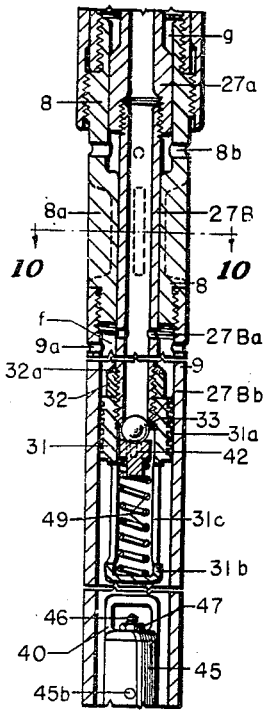
Fig. 5 is a longitudinal section of an upper portion of the device shown in Fig. 3, showing the intake ports open after the packer has been set.
Figure 6:
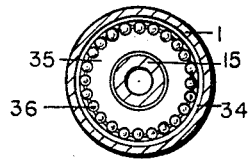
Fig. 6 is a transverse section on the line 6—6, Fig. 2.
Figure 7:
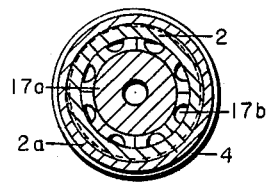
Fig. 7 is a transverse section on the line 7—7, Fig. 2.
Figure 8:
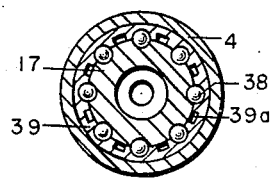
Fig. 8 is a transverse section on the line 8—8, Fig. 2.
Figure 9:
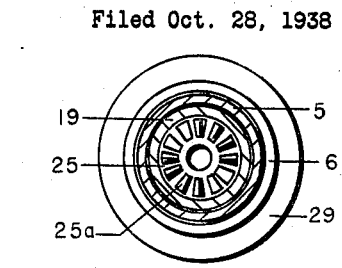
Fig. 9 is a transverse section on the line 9—9, Fig. 2.
Figure 10:
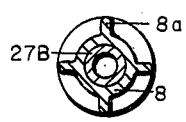
Fig. 10 is a transverse section on the line 10—10, Figs. 5 and 11.

In this movement the intake port carrier nipple 27B is forced downward, until intake ports 27BA are uncovered (see Fig. 5). Well fluid from the rathole then enters the drill stem via inlet 9a, the annular chamber f, and intake ports 27Ba. These ports are again closed by the reverse movement of the nipple 27B when the drill stem is raised at conclusion of the test, thereby entrapping within the drill stem the production from the rathole during the period of the test. In order to repeat such tests in rapid succession without withdrawing the drill stem from the well, the packer may be raised from its seat, thereby causing the intake ports to be closed; whereupon the test fluid may be bailed or swabbed out, after which the tool is ready to be reset and the operation repeated as often as desired.

Some of the flare fluid, discharged as hereinbefore stated, will pass the packer and be found in the drill stem if the packer fails to form a perfect seal-off against downward movement of well liquid above it. If no flare fluid be found in the drill stem, the packer is known to have formed a complete seal-off upon the rathole. In this manner a formation test is made to positively disclose where the test fluid came from.

When the device is withdrawn from the well, in addition to learning the amount and physical properties of the production, it is also desirable to know the temperature at different levels, as well as the temperature variations which obtained in the tested formation during the test, and also the pressures and variations in pressures which obtained there during that time. If the operator checked his time with the timing mechanism of the recording instruments and kept a record of the time when the device was at different levels going in and coming out of the well, as should always be done, the above information will be found in the instrument case, from which the instruments may be removed by unscrewing bottom end member 10 and removing the lid or cover 40.

If the test should reveal unwanted production in the rathole, cement slurry may be pumped through the device and into the formation to be plugged, in which event the cement will take the reverse path to that indicated for the test fluid, as plainly appears in Fig. 5.

Figure 15:
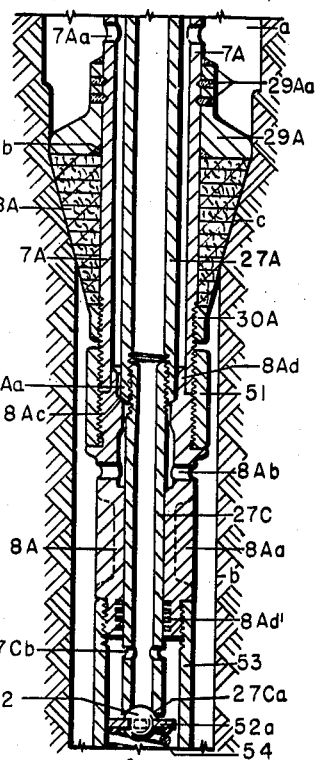
Fig. 15 is a longitudinal section of a portion of the device shown in Fig. 11, illustrating the packer as seated upon a rathole in a well bore and showing the intake ports open as during the formation test.

The first modified form of the invention shown in its normal position of the parts in Fig. 11, and seated upon a rathole intaking test fluid in Fig. 15, is the same as the preferred form shown in Figs. 2 and 3 above the line a—a and below the line b—b. This modified form, therefore, will be considered, for the purpose of completing Fig. 11, as inserted into Figs. 2 and 3 between the lines a—a and b—b.

The outer shell consisting of reducing coupling 6A, packer carrier nipple 7A, coupling 51, connection member 8A, having external longitudinal ribs 8Aa, and internal peripheral grooves 8Ad' which may be filled with metallic rings or packing or allowed to entrap mud rings to aid in maintaining a leak proof sliding fit with the nipple 27C; nipple 53, connection member 55, nipple 9, and other parts below the line b—b the same as in Fig. 3.

Figure 11:
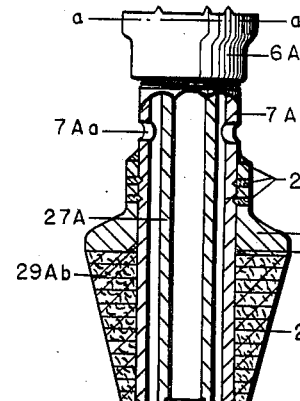
Fig. 11 is a longitudinal section of a portion of the first modified form of the invention, otherwise the same as the preferred form as shown in Figs. 2 and 3. In order to complete this modified form of the invention the illustration in Fig. 11 between the lines a—a and b—b will be considered as replacing that portion of the construction shown in Figs. 2 and 3 between the lines a—a and b—b.

The inner string consists of valve actuating nipple 27A having valve 27Aa formed upon its lower end; intake ports carrier nipple 27C, threadedly joined together, as appears in Figs. 11 and 15, and other parts above the line a—a the same as in Fig. 2.

The packer 28A, similar to the packer of the preceding form, may be of rubber, leather, belting, or any other tough, durable substance as stated for the preceding form. This packer is mounted upon packer carrier nipple 7A, where it is secured between upper retainer 29A and lower retainer 30A, the latter member having threaded engagement upon nipple 27A, the upper retainer being secured upon the nipple 7A by welds 29Aa, and 29Ab.

When the packer is being lowered into the well bore, or being withdrawn therefrom, and while the packer is being seated upon the rathole, the equalizing ports 7Aa and 8Ab are in communication, as appears in Fig. 11, to provide, during such times that well fluid may circulate through the packer. This communication through the packer via ports 7Aa, the annular space exterior of nipples 27A and 27C, and openings 8Ab continues until interrupted by the entrance of the lower end of nipple 27A into the shell 8Ad, within which it has a close sliding fit, just before the seating of valve 27Aa upon its seat 8Ac, at which time all communication through the packer between the well bore and below it terminates. This interruption of pressure equalization above and below the packer, occurs as the packer is seated. Raising the drill stem after valve 27Aa seats far enough to withdraw the lower end of nipple 27A out of the shell 8Ad will always instantly re-establish equalization of pressure above and below the packer. The length of the shell 8Ad need be only such as will guide the valve 27Aa upon its seat 8Ac.

The check valve 52, having radial arms 52A engaging upon the upper end of spring 54, is urged upon its seat 27Ca in the lower end of nipple 27C by the expansive force of spring 54, which is supported upon the connection member 55. This valve serves to exclude well fluid from the drill stem and to allow the drill stem to be pumped through, as was explained for the check valve shown in the preceding form.

The nipple 27C has a close sliding fit within the lower end of member 8A, which thus provides means for normally maintaining the intake ports 27Cb, closed as appears in Fig. 11.

When the packer lands the latch springs, the drill stem is rotated clockwise part of a turn and the clutch disengages, as was explained for the preceding form, valve 27Aa lands upon its seat 8Ac and the intake ports 27Cb open by being forced downward far enough to uncover below the member 8A, as appears in Fig. 15. In this position of the intake ports test fluid from the rathole enters through openings 10a (see Fig. 3), passes around the instrument case, around the check valve assembly, and enters the drill stem through the intake ports 27Cb.

The first modified form may be operated in the same manner and for all of the purposes as stated for the preferred form to which reference is here made.

Figure 16:
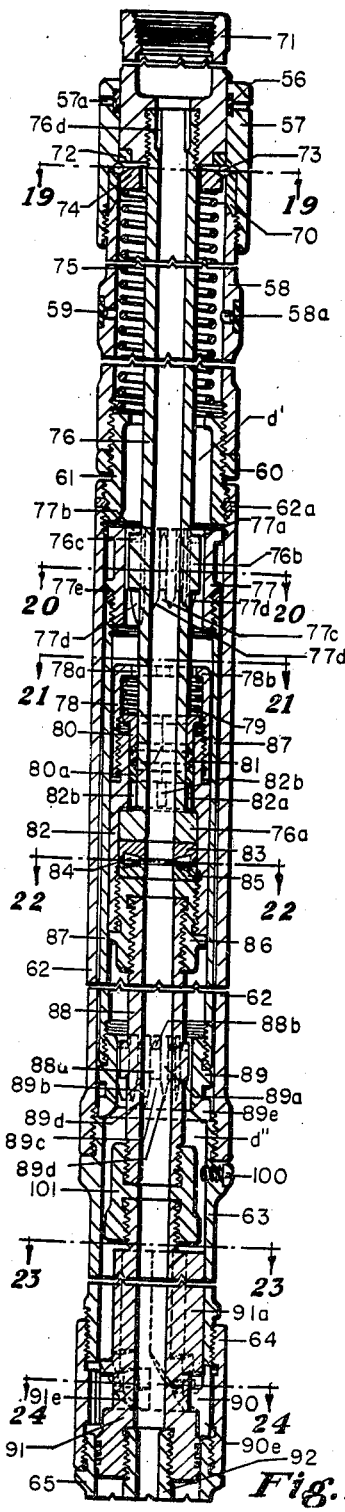
Fig. 16 is a longitudinal section of the upper portion of the second modified form of the invention.
Figure 17:
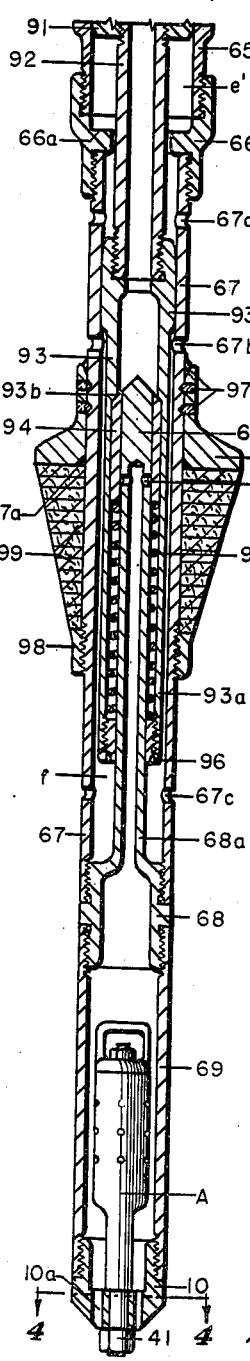
Fig. 17 is mainly a longitudinal section of the lower portion of the second modified form of the invention, completing the device partially shown in Fig. 16.

In the second modified form, Figs. 16 and 17, a similar number of corresponding units to those employed in the preferred form, but having somewhat different construction, are employed in a similar manner as in both preceding forms to accomplish the same result.

The outside shell of the second modified form, having limited telescopic movement over the inner string, consists of latch clamp member 57, latch adjusting nipple 58, connection member 61, locking ring 60, nipple 62, threaded upon member 61, and secured thereon by welds 62a; nipple 63, coupling member 64, nipple 65, connection member 66, packer nipple 67, connection member 68, nipple 69, and bottom end member 10.

The inner string consists of drill stem connection member 71, adapted to be threadedly engaged upon the drill stem 43, in the same manner as indicated for the preferred form in Fig. 1; upper clutch key nipple 76, having special wrench slots 76d; bearing housing member 82, clutch base support 86, lower clutch key nipple 88, connection member 101, clutch shell 91, nipple 92, and valve actuating nipple 93.

A packer element 99, such as was described for the preferred forms of the invention, is closely fitted over the nipple 67 where it is positioned between its upper retaining member 97, secured upon nipple 67 by welds 97a and 97b, and its lower retaining member 98, adapted to engage the packer element closely against the member 97 by means of the threaded engagement of member 98 upon nipple 67.

Pressure of well fluid equalizes above and below the packer thru openings 67b and 67c and the annular space f, Fig. 17. This pressure equalizing communication continues while the device is being lowered into the well or being withdrawn therefrom and while the packer is being seated upon the rathole. If, in securing a good seat for the packer, it should be necessary to make repeated landings of the packer upon the rathole, this may be done without closing the equalizing passages at any time, because when the latch springs the lugs 90, Figs. 16 and 30, arrest the downward movement of the inner string before the intake ports 68b are uncovered by the downward movement of sleeve valve 94, as will be more fully explained. The valve 93c cuts off pressure equalization above and below the packer when it moves downwardly far enough to close ports 67b before the intake ports 68b are uncovered. Pressure equalization above and below the packer is re-established when the drill stem is raised uncovering parts 67b at conclusion of the intaking period and before any lifting force is exerted upon the packer. The packer and outer shell are lifted by the drill stem when the lugs 90 are engaged by the irregular bottom ends of slots 91b in the upward movement of the drill stem at conclusion of the intaking period.

It being always understood that the drill stem is empty when employed to lower the device into a well for a formation test, a check valve is provided to exclude well fluid therefrom until the intake ports are opened to admit test fluid. This valve is so constructed that the drill stem can be pumped thru at any time. The sleeve valve 94 is a combination check valve and means for preventing well fluid from entering the drill stem until the inner string has been forced downward by the weight of the descending drill stem after the latch springs and the drill stem has been rotated clockwise part of a turn and settles, as will be discussed in connection with the clutch. The valve 94 has a close sliding fit within the depending tubular shell 93a of the actuating nipple 93 and has a similar fit over the upstanding tubular extension 68a of the member 68. The coiled spring 95, supported by ring 96, is freely movable within the annular space between extension 68a and the shell 93a and normally urges the valve 94 upon its seat 93b, which seat it never leaves except when pump pressure forces it downward, compressing spring 95 and uncovering ports 68b, at which time fluid from the pump passing downwardly thru the drill stem, moves thru the annular space between the solid upper end 68c and shell 93a, thru the ports 68b, and downwardly thru the tubular extension 68a, whence it passes around the instrument case A, and out thru the openings 10a of the bottom end member 10. Manifestly the expansive force of spring 95 should be such as will safely return the valve 94 to engagement upon its seat 93b and such as will not allow this valve to be unseated by the weight of the test fluid as the drill stem is withdrawn at conclusion of the intaking period. Of course, a bit, ordinarily of the fish tail type, may be substituted for the member 10 if cavings or settlings are apt to be encountered before the packer is landed.

Figure 18:
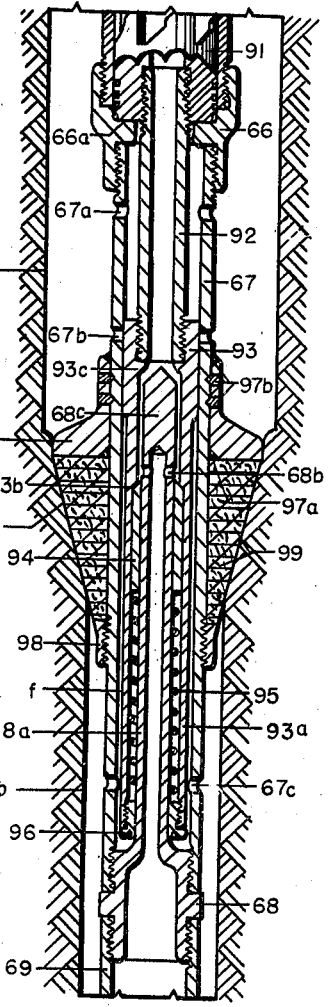
Fig. 18 shows a portion of the device illustrated in Figs. 16 and 17 inserted in a well bore with the packer seated upon a rathole and the intake ports open as during a formation test.

When the packer has been properly landed, a slight clockwise rotation of the drill stem frees the inner string, which descends and forces the valve member 94 downwardly past the intake ports 68b, as appears in Fig. 18. In this position of the ports test fluid from the rathole enters the drill stem via pressure equalizing ports 67c, annular space f, intake ports 68b, and the annular space surrounding extension 68c. The travel necessary to force the sleeve 94 downward far enough to uncover the intake ports, as shown in Fig. 18, is determined by the distance between the lower end of clutch shell 91 and the landing floor 66a, upon which the member 91 lands to stop the downward movement of the inner string. Manifestly, the member 101 could be landed upon the lugs 90 to limit the valve travel, instead of landing the shell 91 upon the floor 66a, as just stated; the choice of which said means to employ, in limiting the valve travel being a matter of construction preference.

The latch assembly consists of ball rider ring 72, latch balls 73, ball floor ring 74, and a circular groove having a depth of slightly less than one-half the diameter of the latch balls, one-half of said groove being formed within the member 57 and the other half thereof being formed within the upper end of the sleeve 70, as appears in Fig. 16. This latch is so similar to the latch shown and described in connection with the preferred form that reference is made thereto. The latch in this modification may be adjusted to engage with less force than when the latch balls are fully engaged within their groove by screwing the nipple 58 upward upon the member 61, thereby forcing the latch balls to engage less deeply within their recess as was also explained for the preferred form. The locking ring 60 may be employed to lock the nipple 58 so as to secure the latch in any adjusted position.

A floating clutch is shown in Fig. 16. This clutch consists of shell upper end member 77, having internal longitudinal ribs 77a and 77b with tapered lower ends, and forming slots 77c, (see Fig. 25); shell 87 threaded upon the member 77, and welded thereto at 77e; lower end member 89, having internal longitudinal ribs 89a and 89b with tapered lower ends 89d, and forming slots 89c; upper clutch key nipple 76, having keys 76b with wedge shaped upper ends 76c; lower clutch key nipple 88, having keys 88a with wedge shaped upper ends 88b, (see Fig. 26); and the thrust bearing consisting of members 83—84 and 85. The upper clutch keys 76b and lower clutch keys 88a are shown to be exactly alike, and the ribs and slots of the upper end member 77 are similar to the ribs and slots of the lower end member 89.

The clutch shell is housed within the nipple 62, and contained therein against longitudinal movement between the lower end of connection member 61 and upper end of nipple 63. The shell has slight end clearance between member 61 and nipple 63, and also slight lateral clearance within the nipple 62. The upper clutch male keys 76b, of equal length, have an easy sliding fit within the slots 77c, (see Fig. 25), and the lower clutch keys 88a, each of equal length, have an easy sliding fit within the slots 89c, Fig. 16. Both upper and lower keys and slots are normally engaged, as shown in Fig. 16, which engagement causes the entire drill stem above and below the thrust bearing to be locked together as a unit against independent rotation.

In operation, the upper and lower sets of male keys are thrust downward when the inner string moves downward after the latch has been sprung and the drill stem has been rotated part of a clockwise turn, as explained. This downward movement, which causes the intake ports 68b to be opened, as appears in Fig. 18, places the keys entirely below the slots. The clutch is then disengaged and the drill stem above the thrust bearing may be rotated independent of all other parts. The packer and the entire outer shell of the device from its lower extremity up to and including its upper member 57, remains stationary while the clutch is disengaged and drill stem is rotated.

The clutch being disengaged, if the drill stem be then raised, the clutch and latch will become re-engaged by the expansive force of latch spring 75, aided by the weight of the outer shell of the device, plus the force required to pull the packer out of its seat in the rathole. The tapered lower ends 77d, Fig. 25, of the upper ribs and the tapered lower ends 89d, of the corresponding lower ribs will guide the upper and lower keys back into their engaged position within slots 77c and 89c respectively. Two of these ribs, the upper one being 77b, of the upper end member 77, and the other one being rib 89b, of the lower end member 89, extend downward below their companion ribs, thus serving as guides to pilot the male keys into their respective slots, similar to the manner in which the ribs and the balls of the clutch, in Fig. 2, were shown to become aligned in the re-engaging movement of the clutch when the drill stem is raised after the intake ports have been uncovered.

The externally flanged end 76a, Fig. 16, engaged under the internal flange 82a, rests upon the thrust bearing assembly composed of top 83, base 85, and rollers 84. This bearing is made leak proof by packing 81 engaged by gland 80 urged upon the packing by spring 79 held in place by the cap 78. It will be observed that the longitudinal slots 82b, in the internal flange 82a, Fig. 16, and the similar slots 78a in the internal flange 78b, in the cap 78, Fig. 21, are adapted to admit and pass over the male clutch keys 76b for convenience in assembling the parts 78 and 82 over the upper clutch key nipple 76 and its keys. The gland 80 is in halves shown cut in two at 80a, Fig. 16, also to enable assembling.

Means for landing the packer is shown proximate the lower end, Fig. 16. The lugs, Fig. 29, removably fitted within the slots 64c, Fig. 28, and secured therein against rotation by internal ribs 64a, having through them slots 64b for circulation of a lubricant, have their shell 90e locked between the nipples 63 and 65, Fig. 16. Each of these lugs is freely received within the lower irregular shaped portions of slots 91b formed by and between ribs 91a, Fig. 30. These irregular portions conform to the shape of the lugs, except that the lugs have space for limited upward movement in the lower end of these slots, as clearly appears in Fig. 30 where a lug, partially broken away, is shown placed in one of the slots 91b. The distance between the upper steps 90a, Figs. 29 and 30, and their opposing steps 91c, in the shell 91, Fig. 30, is equal to the distance between lower steps 90b and their opposing steps 91d. This distance between the steps of the lugs and the steps in the shell is such that when these steps engage the shell 91 may be slightly rotated clockwise to bring the lugs into the lower ends of the straight portions of the slots 91b, at which time the weight of the drill stem will force the shell 91 downwardly far enough to open the intake ports, as appears in Fig. 18.

The packer may be landed upon the rathole as often as necessary to obtain a good seat, as stated. Each time the packer lands the latch will spring and the lugs 90 will engage their steps 90a and 90b upon the opposing steps 91c and 91d of the clutch shell, Fig. 30. Each time the drill stem is raised slightly the latch will reengage and the lugs will move to engage the lower irregular shaped ends of the slots as also appears in Fig. 30. The packer being properly landed, the drill stem is rotated clockwise, causing the lugs to register with the straight portions of the slots, whereupon the drill stem settles, opening the intake ports as stated, and thus begins the intaking period of the test.

The distance between the lugs and their upper opposing steps or seats 91c and 91d when the lugs are in the position shown in Fig. 16, should be less than the travel necessary to disengage the clutch, for the obvious reason that if the clutch should disengage before the lugs engage on their upper landings the drill stem would turn upon the thrust bearing and, therefore, could not then be employed to place the lugs 90 and slots 91b in vertical alignment for the purpose of initiating the valve movement necessary to allow intaking of test fluid through the ports 68b.

It will be noted that the steps 90a are each formed with a sloping upper surface indicated by the angle 90c, Fig. 29, this angle being the same for both steps. The steps 91c and 91d in the shell 91 each have their upper surfaces formed with a mating slope conforming to the angle 90c. This angle inclines so that the drill stem will be raised slightly as it is rotated clockwise part of a turn. These mating engaging surfaces provide that the lugs and their upper steps or landing places will always engage when the latch springs, and that they will not be disengaged unless the drill stem be rotated, as stated.

The distance between the steps 90a and 90b of the lugs and their opposing steps 91c and 91d of the shell, Fig. 30, are not only the same, but these steps are each of equal width. When the drill stem is rotated part of a turn clockwise, in order to bring the lugs and the upper straight portion of the slots 91b into perpendicular alignment, it is apparent that two slight drops of the drill stem will take place; the first drop occurring when the lower steps 90b move to engage the upper steps 91c while the upper steps 90a move into the slots 91b. This drop will be one to two inches, such being the usual length of the steps. The second downward movement of the drill stem will occur when the drill stem has been rotated clockwise slightly further, at which time the lower steps 90b disengage from the upper steps 91c and all of the lugs 90 enter the slots 91b. This second downward movement of the drill stem causes the clutch to disengage and the intake valve to open as has been previously explained.

When the drill stem is raised at conclusion of the intaking period, the inclined surfaces 91e, Fig. 30, each being at the same angle, will guide the lugs, then having their lower sloping surfaces 90d landed upon the inclined surfaces 91e, back into the position shown in Fig. 16.

The latch clamp member 57 has a close sliding fit over the connection member 71. Packing 56 is compressed against member 71 by well fluid acting through pressure ports 57a. The annular chamber d' within the nipple 58 and member 61, Fig. 16, may be filled with a lubricant of such color as will identify it from the well fluid as was explained for the preferred form. This lubricant, in addition to easing the action of the latch, in the chamber d', serves as a flare, which will be forced out through the discharge ports 58a and past rubber band 59 by member 71, when the intake valve opens.

Such displacement occurs because the member 71 is of somewhat greater diameter than the piston-like lower end of member 91. Manifestly, well fluid will be drawn into the chamber d' when the member 71 returns to the position shown in Fig. 16 at conclusion of the intaking period. This chamber should be drained and refilled with flare fluid each time the device is withdrawn from the well. Such drainage and refilling may be accomplished through the openings shown closed by band 59. The chamber d", Fig. 16, may be also filled with a lubricant for the clutch and associated parts. The slots 89e, Fig. 16, provide that this lubricant may circulate between member 89 and the upper end of nipple 63. The opening shown closed by plug 100 provides means for filling or draining this chamber. It is apparent that the chamber e', Fig. 17, may be also filled with a flare fluid and the breather openings 67a closed with an elastic band, such as the one shown at 59; thereby replacing or supplementing the use of chamber d' for the purpose of discharging flare fluid above the packer.

The instrument case held in place by nut 41 and indicated generally at A, Fig. 17, being substantially the same as the one shown in Fig. 3 of the preferred form, reference is made to that specification.

The purposes and operation of the second modified form is like that described for the preceding forms to which reference is made.

It is understood that all references to positions and directions such as "upper" and "lower," "upward" and "downward," "above" and "below" apply to the tool as illustrated in the accompanying drawings wherein the upper portion of the tool is shown uppermost.

It is understood that the details of construction and arrangement of parts are subject to many obvious variations and minor changes without departing from scope and purpose of my invention as defined by the appended claims.

I claim:

1. A tool of the character described including an operating pipe, a shell thereon, a packer fixed to said shell to seat in the well bore and support said shell, ports in said shell above and below said packer, a restricted bore in said shell between said ports so as to allow fluid passage between said ports, and an enlargement on said pipe to move into said restricted bore to separate the areas in said bore above and below the packer.

2. A tool of the character described including an operating pipe, a shell thereon, a packer fixed to said shell to seat in the well bore and support said shell, ports in said shell above and below said packer, a restricted bore in said shell between said ports so as to allow fluid passage between said ports, an enlargement on said pipe to move into said restricted bore to separate the areas in said bore above and below the packer, and additional registering ports on said pipe and shell to admit fluid to said pipe from below said packer when the pipe is moved to close said bore.

3. A tool of the character described including an operating pipe, a shell thereon, a packer fixed to said shell to seat in the well bore and support said shell, ports in said shell above and below said packer, a restricted bore in said shell between said ports so as to allow fluid passage between said ports, an enlargement on said pipe to move into said restricted bore to separate the areas in said bore above and below the packer, and a latch between said shell and pipe to be released upon movement of said pipe relative to the shell.

4. A tool of the character described including an operating pipe, a shell thereon, a packer fixed to said shell to seat in the well bore and support said shell, ports in said shell above and below said packer, a restricted bore in said shell between said ports so as to allow fluid passage between said ports, an enlargement on said pipe to move into said restricted bore to separate the areas in said bore above and below the packer, and a clutch between said shell and pipe to be released upon movement of said pipe relative to the shell.

5. A tool of the character described including an operating pipe, a shell thereon, a packer fixed to said shell to seat in the well bore and support said shell, ports in said shell above and below said packer, a restricted bore in said shell between said ports so as to allow fluid passage between said ports, an enlargement on said pipe to move into said restricted bore to separate the areas in said bore above and below the packer, and a latch and clutch between said shell and pipe to be released upon movement of said pipe relative to the shell.

6. A string of pipe, a shell slidable thereon, a latch to normally prevent sliding of said shell, spaced ports in said shell, a packer between said ports, a valve member on said pipe, and means in said shell to receive said member to prevent a flow between said ports.

7. A string of pipe, a shell slidable thereon, a latch to normally prevent sliding of said shell, spaced ports in said shell, a packer between said ports, a valve member on said pipe, means in said shell to receive said member to prevent a flow between said ports, and additional ports on said pipe which are normally covered by said shell but uncovered when said pipe slides relative to said shell whereby fluid from the well bore below said packer is admitted to said pipe.

8. A string of pipe, a shell slidable thereon, a latch to normally prevent sliding of said shell, spaced ports in said shell, a packer between said ports, a valve member on said pipe, means in said shell to receive said member to prevent a flow between said ports, additional ports on said pipe which are normally covered by said shell but uncovered when said pipe slides relative to said shell whereby fluid from the well bore below said packer is admitted to said pipe, and a check valve to close said pipe against inflow irrespective of movement of said pipe.

9. A string of pipe, a shell slidable thereon, a latch to normally prevent sliding of said shell, spaced ports in said shell, a packer between said ports, a valve member on said pipe, means in said shell to receive said member to prevent a flow between said ports, and telescoping sleeves on said pipe and shell adapted for relative movement by said pipe to admit well fluid from below said packer.

10. A string of pipe, a shell slidable thereon, a latch to normally prevent sliding of said shell, spaced ports in said shell, a packer between said ports, a valve member on said pipe, means in said shell to receive said member to prevent a flow between said ports, and telescoping sleeves on said pipe and shell adapted for relative movement by said pipe to admit well fluid from below said packer, one of said sleeves being upstanding from said shell to fit within said pipe sleeve.

11. An operating string of drill stem or pipe, a shell adapted to have limited telescopic movement over the lower portion of said pipe, a packer on said shell, pressure equalizing ports in said shell above and below said packer, intake ports for test fluid in said shell below the packer, a portion of said shell being formed into a sleeve through which a portion of said pipe is closely slidable, intake ports in said pipe, said ports being normally closed by said sleeve, three pistons on said pipe, two chambers for flare fluid, one under each of two of said pistons, telltale fluid in each of said two chambers, a latch adapted to releasably engage said pipe and shell, a clutch adapted to releasably engage said pipe and shell, a thrust bearing in said pipe below the clutch, a check valve upon the lower end of said pipe, said valve being adapted to permit pump fluid from above the well to pass through the drill stem and to prevent well fluid from entering the same, the third pitson on said pipe being to prevent pump fluid from passing out of the shell through the intake ports therein and to cause such pump fluid to pass out of the shell through the lower end thereof, an instrument case in said shell below the packer, and means for lifting the packer from its seat while closing the intake ports without closing the pressure equalizing ports.

12. An operating string of drill stem or pipe, a shell adapted to have limited telescopic movement over the lower portion of said pipe, a packer on said shell, pressure equalizing ports in said shell above and below said packer, intake ports for test fluid in said shell below the packer, a portion of said shell being formed into a sleeve, intake ports in said pipe, said ports being normally closed by said sleeve, a check valve upon the lower end of said pipe, said valve being adapted to permit pump fluid from above the well to pass through the drill stem and to prevent well fluid from entering the same, and means for lifting the packer from its seat while closing the intake ports without closing the pressure equalizing ports.

13. An operating string of drill stem or pipe, a shell adapted to have limited telescopic movement over the lower portion of said pipe, a packer on said shell, pressure equalizing ports in said shell above and below said packer, intake ports for test fluid in said shell below said packer, a connection member on said shell formed into a sleeve over a lower portion of said pipe, a valve on said pipe adapted to engage a seat within said sleeve, intake ports in said pipe, said ports being normally closed by said sleeve, two pistons on said pipe, a chamber for flare fluid under one of said pistons, a piston in said chamber, telltale fluid in said chamber, a latch adapted to releasably engage said pipe and shell, a clutch adapted to releasably engage said pipe and shell, a thrust bearing in said pipe below the clutch, a check valve upon the lower end of said pipe, said valve being adapted to permit pump fluid from above the well to pass through said pipe and to prevent well fluid from entering the same, an instrument case in said shell below the packer, and means for lifting the packer from its seat while closing the intake ports without closing the pressure equalizing ports.

14. An operating string of drill stem or pipe, a shell adapted to have limited telescopic movement over the lower portion of said pipe, a packer on said shell, pressure equalizing ports in said shell above and below said packer, intake ports for test fluid in said shell below said packer, a connection member of said shell formed into a sleeve over a lower portion of said pipe, a valve on said pipe adapted to engage a seat within said sleeve, a clutch adapted to releasably engage said pipe and shell, intake ports in said pipe, said ports being normally closed by said sleeve; a check valve upon the lower end of said pipe, said valve being adapted to permit pump fluid from above the well to pass through the pipe and to prevent well fluid from entering the same, and means for lifting the packer from its seat while closing the intake ports without closing the pressure equalizing ports.

15. An operating string of drill stem or pipe, a shell adapted to have limited telescopic movement over the lower portion of said pipe, a packer on said shell, pressure equalizing ports in said shell above and below said packer, a portion of said shell above the packer formed into a sleeve for a tubular piston valve, a tubular piston valve on said pipe slidable in said sleeve and adapted to close the upper equalizing ports of said shell, a tubular member upstanding within said shell, the upper end of said tubular member being closed, lateral openings in said tubular member below its closed upper end, a sleeve check valve adapted to prevent well fluid from entering said pipe, said valve being slidable over said tubular member and also slidable within said pipe and being adapted to uncover discharge ports for pump fluid when the same is forced through said pipe, said ports also being intake openings for test fluid when the packer is set and the pipe is rotated to disengage the clutch, two additional pistons in said pipe, a chamber for flare fluid under each of said two pistons, telltale substances in each of said chambers, said substances being of different colors, a latch adapted to releasably engage said pipe and shell, a clutch adapted to releasably engage said pipe and shell, a thrust bearing in said pipe below the clutch, an instrument case in said shell below the packer, and means for lifting the packer from its seat while the intake openings are closed without closing the pressure equalizing ports.

16. An operating string of drill stem or pipe, a shell adapted to have limited telescopic movement over the lower portion of said pipe, a packer on said shell, pressure equalizing ports in said shell above and below said packer, a portion of said shell above the packer formed into a sleeve for a tubular piston valve, a tubular piston valve on said pipe slidable in said sleeve and adapted to close the upper equalizing ports of said shell, a tubular member upstanding within said shell, the upper end of said tubular member being closed, lateral openings in said tubular member below its closed upper end, a sleeve check valve adapted to prevent well fluid from entering said pipe, said valve being slidable over said tubular member and also slidable within said pipe and being adapted to uncover discharge ports for pump fluid when the same is forced through said pipe, said ports also being intake openings for test fluid when the packer is set and the pipe is rotated to disengage the clutch, and means for lifting the packer from its seat while the intake openings are closed without closing the pressure equalizing ports.

17. In a tool of the character described, a string of operating pipe, a shell having limited telescopic movement over the lower portion thereof, a packer on said shell, means for equalizing pressure above and below said packer at all times when the tool is not intaking test fluid, means for admitting test fluid after the packer is set, and means for closing the tool to admission of well fluid when the packer is raised from its seat.

ALEXANDER BOYNTON.